United States Patent [19]
Charlot et al.

[11] Patent Number: 5,521,872
[45] Date of Patent: May 28, 1996

[54] APPARATUS AND METHOD FOR CONTROL OF A FIRST INPUT FIRST OUTPUT TYPE DEVICE

[75] Inventors: Didier Charlot, Grenoble; Fathy Yassa, Tencin, both of France

[73] Assignee: Thomson Consumer Electronics S.A., Courbevoie, France

[21] Appl. No.: 292,439

[22] Filed: Aug. 18, 1994

[30] Foreign Application Priority Data

Aug. 24, 1993 [FR] France ..................... 93 10204

[51] Int. Cl.$^6$ ................................. G11C 13/00
[52] U.S. Cl. ................. 365/189.12; 365/230.03; 365/238.5
[58] Field of Search .............. 365/189.12, 189.04, 365/230.01, 230.03, 230.04, 230.06, 230.08, 230.09, 238.5

[56] References Cited

U.S. PATENT DOCUMENTS 4,903,285  2/1990  Knierim et al. ................. 377/78
5,363,330  11/1994  Kobayashi et al. ............. 365/238.5

*Primary Examiner*—Terrell W. Fears
*Attorney, Agent, or Firm*—Joseph S. Tripoli; Peter M. Emanuel; Robert D. Shedd

[57] ABSTRACT

A first input-first output type circuit manages m n-bit words using m stages connected in series with first and second non-overlapping clock signals controlling even-numbered and odd numbered ones of the m stages, respectively. A process for controlling the circuit involves a first write step during which each word in a first half of the m words is written into both an odd-numbered stage and a successive even numbered stage so that m/2 of the m words occupy all m of the stages. After the first write step is completed, a second write step begins during which the m/2 words written during the first write step are shifted and stored in the ((m/2)+1)-th through m-th stages. Writing is disabled in each of the m stages beginning with the m-th stage and proceeding successively to the first stage. The m/2 words not written during the first write step are written into those stages not yet disabled in the same manner as in the first write step. At the end of the second write step, each of the m words is stored in a respective one of the m stages. A read step that follows the second write step involves successively shifting words from one stage to another and reading a word from the m-th stage after completion of the shift.

18 Claims, 5 Drawing Sheets

APPARATUS AND METHOD FOR CONTROL OF A FIRST INPUT FIRST OUTPUT TYPE DEVICE

BACKGROUND OF THE INVENTION

1. Field of the Invention

This invention concerns a process for the control of a first input-first output (FIFO) type circuit, this FIFO circuit being used to manage a large number of data. This invention also concerns a device for the embodiment of this process.

The process and the control device for the FIFO circuit conform with this invention have been developed to manage a circuit in order to store a complete line of a video signal forming part of an HD MAC signal. However it will be obvious to the expert in the field that this FIFO circuit could be used for other applications.

2. Description of the Prior Art

Thus for an HD MAC picture, a video line generally contains 1296 9-bit words that will be sub-sampled so as to respect Shanon's theorem. Consequently in order to process an HD MAC video line, it must be possible to store at least 2592 9-bit words in a circuit that must be written at 40.5 MHz. Moreover, in order to perform a number of procedures or corrections on the video signal thus stored, the signal has to be sent to an external microcontroller. This is generally done using a bus with a data exchange rate varying between 100 kbits per second and 400 Kbits per second for the fastest buses. It is therefore read at a slower speed than it is written. In this case, a number of circuits may be used to store the video line. In particular, a RAM type memory circuit can be used with demultiplexed inputs and multiplexed outputs in order to write at 40.5 MHz.

However, the management of multiplexed inputs and demultiplexed outputs is complex and requires the use of several different clock signals. Moreover, this part requires a large number of transistors for its manufacture.

Consequently, the idea of using a first input-first output type circuit made by shift registers was conceived in order to store an HD MAC type video line. However, the use of shift registers as a storage circuit requires the use of two stages for information to be stored in order to avoid losing this information. Therefore the capacity of the shift register has to be doubled.

SUMMARY OF THE INVENTION

The purpose of this invention is to correct this disadvantage by proposing a specific control process for a first input-first output type circuit composed of shift registers that can store a large number of words with a very high access speed and a slower reading speed.

Consequently, the purpose of this invention is a control process for a first input-first output type circuit capable of managing m n-bit words (where m is large and $n \geq 1$), the said circuit consisting of n shift registers with m stages in series, the even stages being controlled by a first clock signal and the odd stages being controlled by a second clock signal, the clock signals not overlapping, wherein the process comprises:

a first write step in which each word is written in two successive stages as a function of clock signals, this first step terminating when m/2 words have been written;

a second write step in which, at each clock signal, writing is successively disabled in the $m^{th}$ stage to the first stage, the write being done in the first step in stages not yet disabled, and a read step consisting of successively shifting words in one stage into the other stage at each clock signal, a word being read at the end of the shift.

Therefore this means that the read speed is lower than the write speed in the shift register.

Another purpose of this invention is a control process for a first input-first output type circuit capable of managing m n-bit words (where m is large and $n \geq 1$) using a circuit similar to that described above in which the two write steps are identical to the write steps mentioned above, but in which the read step consists of successively shifting words in one stage into the other stage on each clock signal (reading being done on the output stage every 2 clock signals).

This makes it possible to read at the same speed as writing in the first input-first output type circuit.

Preferably, the first and second clock signals will correspond to the two phases of the same clock signal, these two phases do not overlap, the frequency of the clock signal is generally higher than 1 MHz and is preferably equal to 40.5 MHz.

According to another characteristic of this invention, write steps are not authorized during a read step. Write and read steps are preferably separated in time. However, the read step may be initialized during the second write step.

According to a preferred method of embodiment of this invention, the write authorization in an shift register stage is given by the following formula:

$$L=1 \ if \ \Phi(Suiv+W_0)=1$$

where L is the value of a "LATCH" circuit, $\Phi$ represents the clock signal phases $\Phi 1$ or $\Phi 2$ depending on whether the stage is even or odd, $W_0$ is the write validation pulse during the first write step, Suiv is the enable signal for the next phase, and . and + are logical operations, the last stage being initialized by the value $W_0+R=1$ where R is the read signal.

Another purpose of this invention is a device for embodiment of the above process, wherein odd stages and even stages are connected to clock signals such that odd stages receive the first clock signal on their first input and the second clock signal on their second input, whereas even stages receive the second clock signal on their first input and the first clock signal on their second input, odd stages receiving a reverse pulse $Wo\Phi 1$ and even stages receiving a reverse pulse $Wo\Phi 2$ where Wo is a write validation pulse, a read validation pulse R being applied to the last stage of the shift register.

BRIEF DESCRIPTION OF THE DRAWINGS

Other characteristics and advantages of this invention will become obvious when reading the following detailed description of a method of embodiment, this description being made with reference to the drawings in the appendix, in which.

DESCRIPTION OF A PREFERRED EMBODIMENT

This invention will be described with reference to the storage of a supersampled HD MAC video line containing 2592 9-bit words. In order to store this video line, this invention uses a first input-first output (FIFO) type circuit capable of storing m n-bit words where m=2592 and n=9. In this invention, the FIFO circuit is a circuit consisting of shift registers with m stages, n shift registers being installed in parallel and receiving the same clock signals as explained below. Consequently, the FIFO circuit contains m×n static memory points. The control process for this first input-first output type circuit will be described with reference to FIGS. 1 to 3.

On these figures, the m squares referenced $E_i$, $E_p$ (i=odd, p= even); $E_{m-3}$, $E_{m-2}$, $E_{m-1}$, $E_m$ in the horizontal direction represent the m stages also called memory points in a shift register, whereas the squares in the vertical direction represent the variation of the shift register as a function of the m clock phases necessary to write the m shift register stages. For the purposes of this invention, the odd stages are enabled during the Φ1 clock signal, whereas even stages are enabled during the Φ2 clock signal. The Φ1 and Φ2 clock signals represent the two phases of the same clock signal which, when processing an HD MAC type video signal, is a 40.5 MHz signal. Within this invention, the Φ1 and Φ2 phases do not overlap, and are applied on registers installed in parallel.

Figure 1:
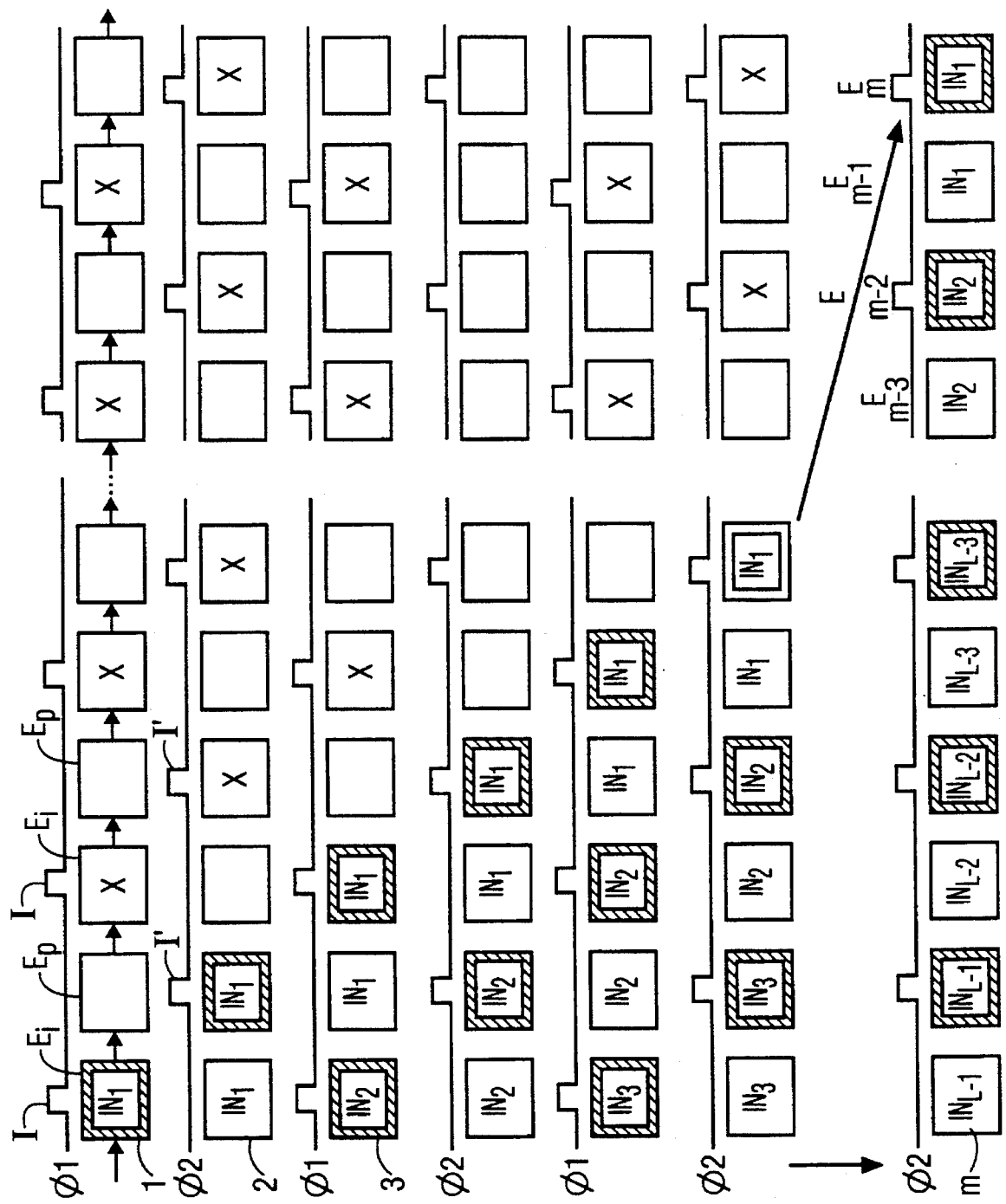
FIG. 1 is a schematic view representing the first write step in a shift register used in a FIFO circuit in accordance with this invention, as a function of the clock signal.

We will firstly explain how the first write step works, with reference to FIG. 1. This write step is conventional, and for its operation uses two shift register stages to write one data bit. Thus in order to write n bits in the first word referenced $in_1$ in the first stage of n shift registers connected in parallel during phase Φ1, all odd stages referenced $E_i$ are opened as shown in line 1, so that information $in_1$ can be entered in the first stage of the n registers in parallel. Then during phase Φ2 of the clock signal, even stages referenced $E_p$ of shift registers are opened with pulse 1', and information $in_1$ is transferred from the first odd stage $E_i$ into the next even stage $E_p$, while remaining in the previous odd stage as represented on line 2 in FIG. 1. During the next Φ1 clock phase, the odd stages are opened again causing information $in_1$ to be written in the next odd stage, and information $in_2$ to be written in the first odd stage $E_i$, as shown on line 3 on FIG. 1. Writing continues in the same way as a function of phases Φ2 then Φ1 of the clock signal. This operation is repeated until information $in_{l-1}$ corresponding to the $(l-1)^{th}$ word is written in the first odd stage and the first even stage represented on line m in FIG. 1. In this case, l–1 corresponds to m/2, where m is the number of words to be written, namely 2592 within this invention.

Consequently, the last stage of the shift register, namely stage $E_m$, is written with the bit corresponding to the first word, namely the bit $in_1$, stage $E_{m-1}$ is also written with bit $in_1$ whereas sages $E_{m-2}$ and $E_{m-3}$ are written with bit $in_2$ and so on as shown on line m.

Therefore after this first write step, we have stored m/2×n bits in the FIFO circuit considered, namely 1296 9-bit words for an HD MAC type video signal. Therefore we note that the first word input is then stored in the last two stages of the FIFO type circuit, the second word is stored in the previous two stages, etc. as explained above.

After this write step, a second write step is carried out in order to compress all data previously written in shift registers and to write subsequent words. This second step is shown schematically on FIG. 2. This second step consists mainly of disabling writing in the second stage written in the FIFO type circuit. Thus as shown on FIG. 2, we start firstly by disabling writing in the last stage of the shift register, namely in stage Em that contains the information $in_1$. Thus during the first phase Φ1 of the clock signal in the second write step, the last stage Em is disabled, but stage $E_{m-1}$ is enabled by pulse 1, and the information in the previous word $in_2$ is written in it. This write operation is also carried out in all previous stages of the same rank. Moreover, the first stage receives information $in_1$ as shown on line 1' in FIG. 2. Thus only stage $E_m$ is disabled, writing in other stages being done as in the first write step. In the next phase Φ2, writing is disabled in stage $E_{m-1}$ that contains information $in_2$, but the information in the previous word is written in stage $E_{m-2}$, namely information $in_3$ as shown on line 2' and so on for all stages with the same rank, the information inl being kept in the first stage and written in the next stage. In the next phase Φ1, stage $E_{m-2}$ is disabled, and stages $E_{m-1}$ and $E_m$ also remaining disabled. Previous stages are written in accordance with the procedure for the first write step, and the first stage receives information from the next word $in_{l+1}$ and so on. In the same way, clock phase after clock phase, writing is disabled in the various stages of the shift registers until the first stage $E_1$ which then contains information $in_m$. Consequently when on line referenced m', where m' corresponds to m, each stage in the shift register contains information corresponding to one of the m words to be stored. This specific write procedure makes it possible to use shift registers including the same number of shift stages as there are words to be written, in other words a FIFO type circuit with a storage capacity of one memory point per bit. This is particularly useful when the number of words to be stored is very large, as in the case of an HD MAC type video line.

Obviously in the case of the circuit described above, the expert in the field will realize that the system must contain a signal indicating that half of the words have been written in the FIFO type circuit. If this type of signal does not exist, for the first write step we can use a signal to enable writing words from one stage into the other, phase after phase of the clock signal, which would start with the first word and terminate with the last word.

Figure 2:
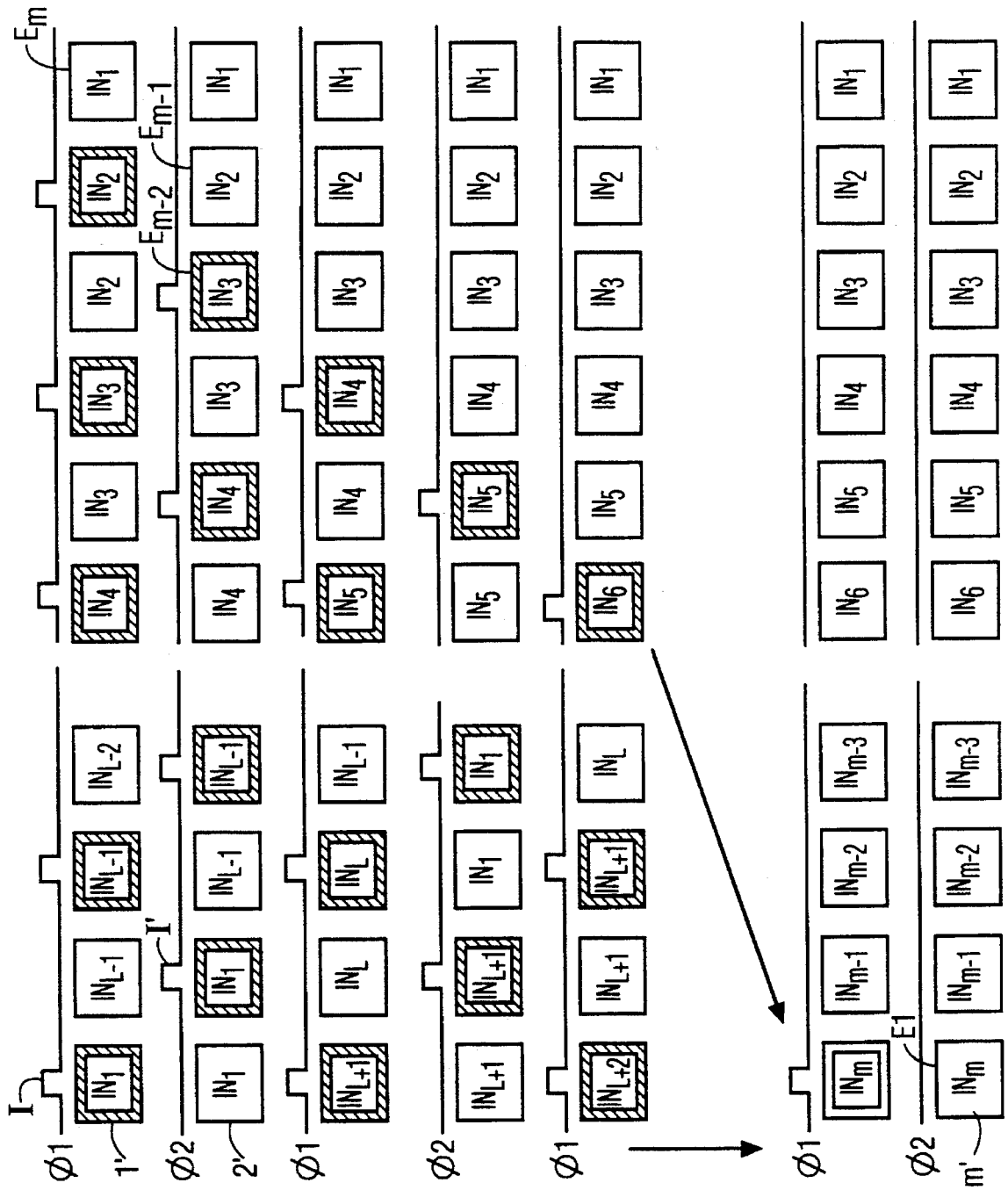
FIG. 2 is a schematic view identical to that in FIG. 1, representing the second write step.
Figure 3:
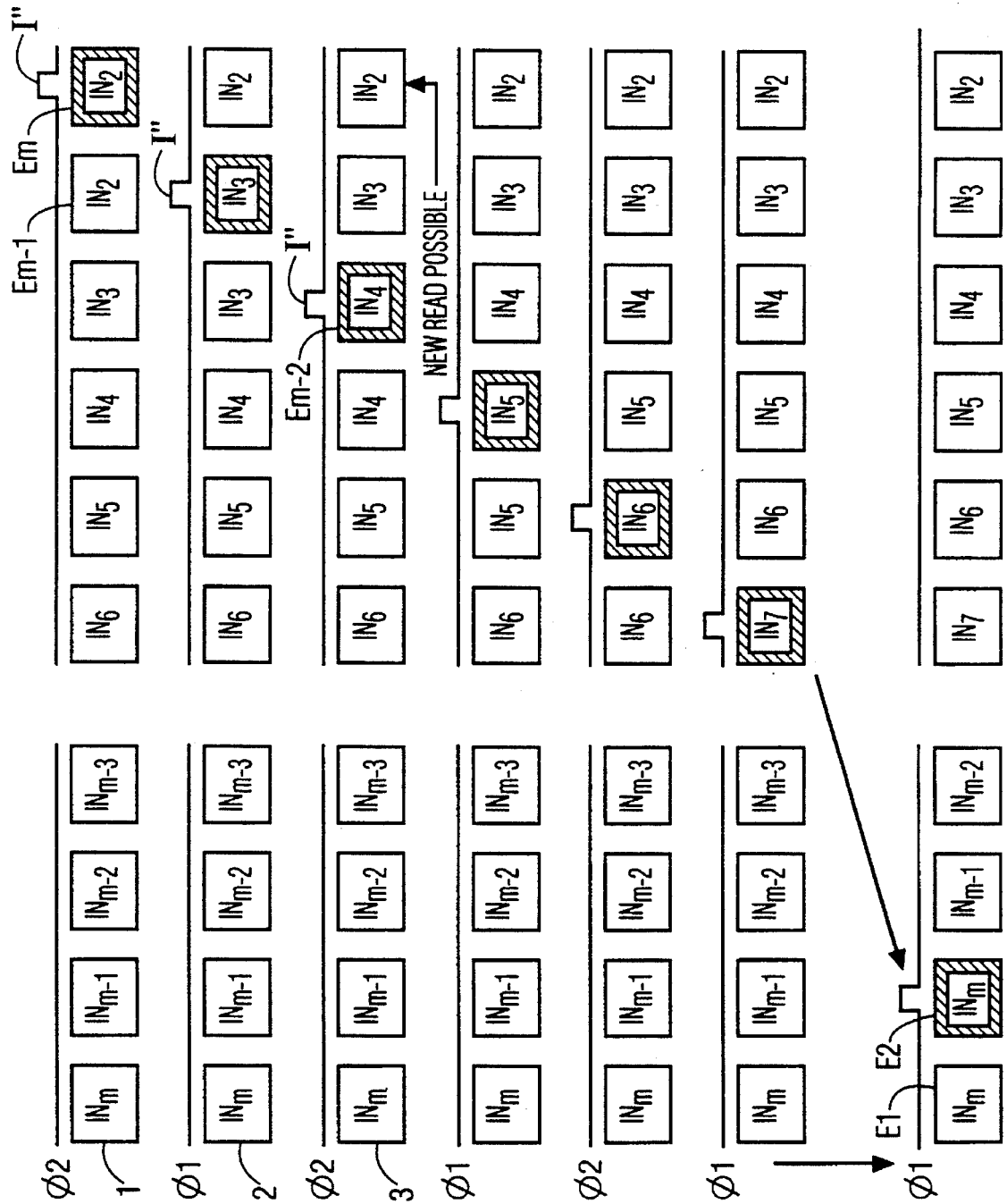
FIG. 3 is a schematic view identical to that in FIG. 1 representing a read step.

We will now describe a first method of performing the read step, with specific reference to FIG. 3. FIG. 2 shows that at the end of the second write step, the last stage of the shift register includes the first stored word, namely information $in_1$. Therefore this word is directly readable in output. When this word is read, the previous word, namely information $in_2$, has to be moved into stage $E_m$. This is done by shifting the contents of the last but one stage, namely stage $E_{m-1}$, into the last stage $E_m$. In order to obtain this shift, each stage in the shift register from stage $E_m$ to stage $E_1$ is opened and then closed. This operation is done during each clock phase. Thus stage $E_{m-1}$ is opened in the first phase Φ1, then stage $E_{m-2}$ is opened in the next phase Φ2, and so on until the first stage. A stage is opened when it receives the 1" pulse. When m cycles have been executed, the $E_m$ stage contains information $in_2$, namely the information corresponding to the second word that can be read and the previous stages contain information $in_3$ to $in_m$ correctly shifted. In this case, reading is much slower than writing.

However, if we look at FIG. 3, we can see that in clock phase Φ2 corresponding to line 3, we already have the information in2 in the Em output stage, and at this moment it is possible to read the second stored word. Consequently, every two clock phases, it is possible to restart reading the information on the last stage of the FIFO type circuit. Consequently, according to one variation of embodiment of this invention, a read can be done every cycle, thus accelerating the read speed.

Figure 4:
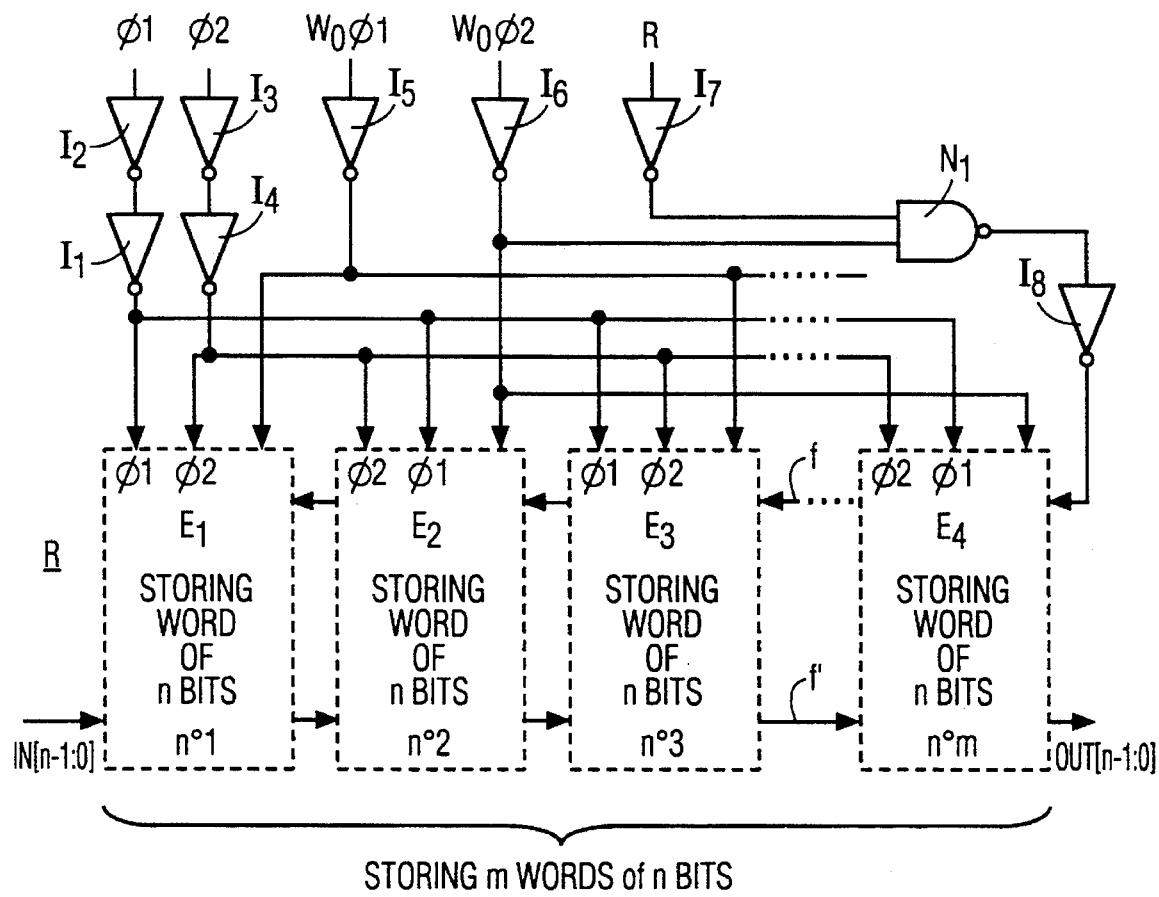
FIG. 4 is a simplified electrical schematic of a method of making the control circuit used to implement the process and FIG. 5 is a simplified electrical schematic of one stage of the control circuit.
Figure 5:
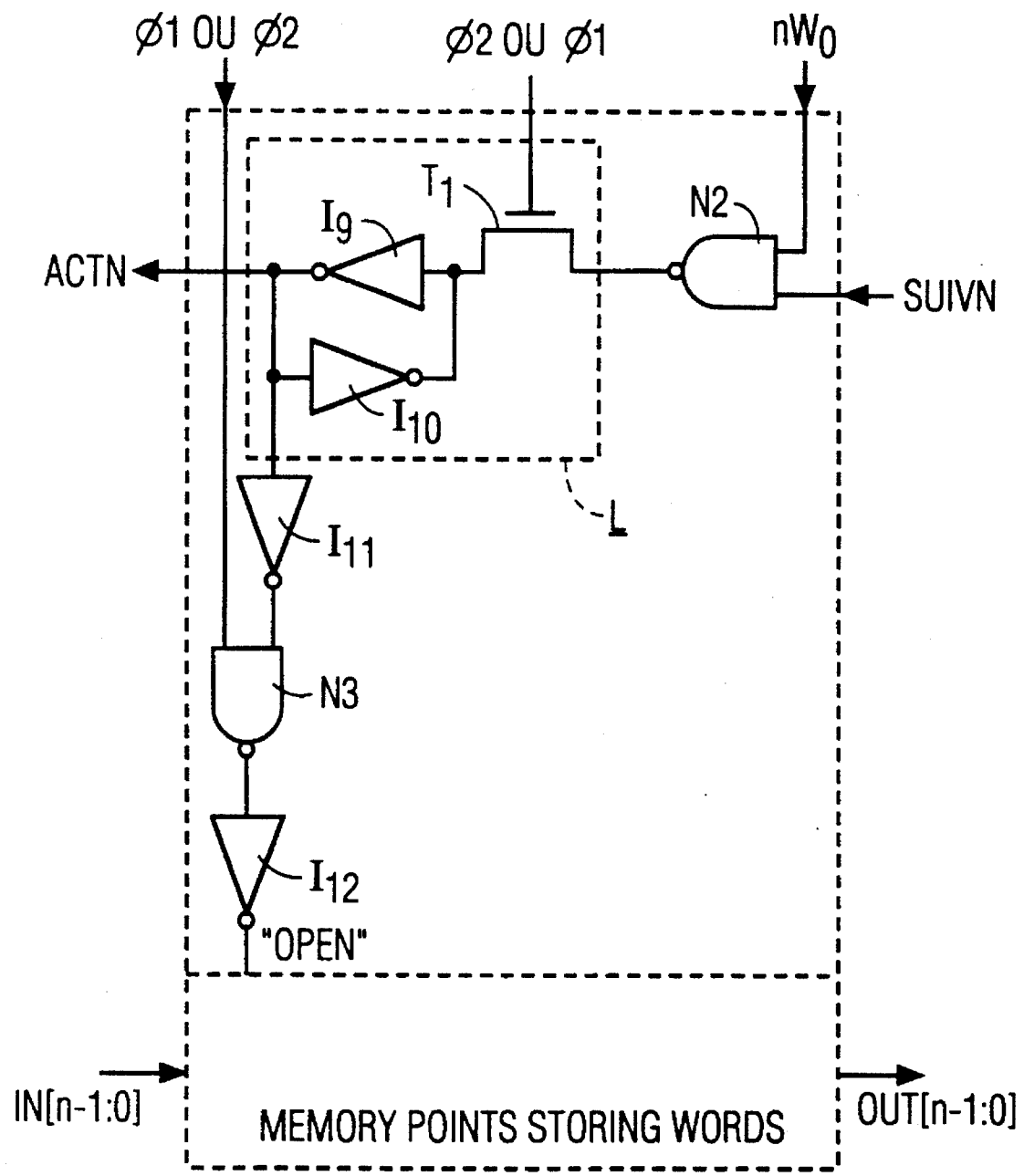

We will now describe a possible method of embodiment for the various circuits to implement the control process in accordance with this invention, with reference to FIGS. 4 and 5. As shown on FIG. 5 representing one stage of an shift register with m stages, shifting information from one stage into the next stage is symbolized by the in [n−1;0] and out [n−1;0] arrows, and is enabled by an "OPEN" pulse. When this pulse is equal to 0, each stage keeps this information corresponding to a write disable, and when this pulse is equal to 1 the stage is equal to the value of the previous stage, which corresponds to a write enable.

As shown on FIG. 4, a shift register R for the embodiment of the process in this invention comprises m stages $E_1$ to $E_m$ in series. On the first and second inputs, these stages receive clock impulses $\Phi_1$, $\Phi_2$. As shown in FIG. 4, the odd stages $E_1$, $E_3$ and even stages $E_2$, $E_m$ are connected to phases $\Phi_1$ and $\Phi_2$ such that the odd stages receive $\Phi_1$ on their first input and $\Phi_2$ on their second input, whereas even stages receive $\Phi_2$ on their first input and $\Phi_1$ on their second input. As shown on FIG. 4, phases $\Phi_1$ and $\Phi_2$ are input on the different stages of the shift register through inverters $l_1$ and $l_2$, and $l_3$ and $l_4$ respectively, in series.

Moreover, odd stages receive a signal $W_0\Phi_1$ inverted by inverter $l_5$, whereas even stages receive a signal $W_0\Phi_2$ inverted by inverter $l_6$, the signal $W_0$ validating the first write step. $W_0\Phi_1$ and $W_0\Phi_2$ are functionally identical to $W_0$, but are shifted with respect to each other by one phase. Moreover, an R signal validates the read step. This R signal is sent into an inverter $l_7$, the output of which is sent to the input of a NAND gate N1, the other input of which receives the inverted $W_0\Phi_2$ signal. The output from the NAND gate N1 is sent to the inverter $l_8$, the output of which is sent to the input of the last stage $E_m$ of the shift registers. This read pulse is propagated from the last stage $E_m$ of the shift registers to the first stage $E_1$ of the shift registers as shown by arrow f, whereas data input in the first stage of shift registers move into the last stage $E_m$ of shift registers as shown by arrow f'.

We will now describe a specific method of embodiment of the control circuit associated with each stage of a shift register, with reference to FIG. 5. The control circuit associated with each stage of a shift register obtains the "OPEN" pulse, this pulse being equal to 0 in the case of a write disable and equal to 1 in the case of a write enable. As shown on FIG. 5, the control circuit associated with each stage or memory point firstly includes a NAND N2 that receives the pulse of the Suiv n read output from the Suiv stage on one input, and the pulse n W0 that may be equal to W0$\Phi_1$ or W0$\Phi_2$, depending on whether the stage is even or odd on its other input, where W0 is the pulse that enables the first write phase in the FIFO type circuit. The output from NAND N2 is sent to the input of the "LATCH" circuit L. The "LATCH" L clock is connected to $\Phi_1$ or $\Phi_2$ control pulses depending on whether the stage is even or odd, as shown in FIG. 5. The "LATCH" L circuit comprises a MOS type transistor $T_1$ receiving either the $\Phi_1$ pulse or the $\Phi_2$ pulse on its grid, and a first inverter $l_{19}$ onto which a second inverter $l_{10}$ is looped back.

The output from the "LATCH" circuit L is sent either to the previous stage (if it receives the $\Phi_1$ pulse) where it provides a pulse referenced ACTN depending on the read pulse, or to the input of an inverter $l_{11}$ (if it receives the $\Phi_2$ pulse). The inverter output is sent to the input of a NAND N3 circuit that receives either the $\Phi_1$ pulse or the $\Phi_2$ pulse on its other input, depending on whether the stage is even or odd. The output from the NAND N3 circuit is sent to an inverter $l_{12}$, the output of which gives the "OPEN" pulse enabling or disabling writing in the stage corresponding to the shift register.

In this circuit, the value of the "LATCH" L indicates if the previous storage word is written in the current stage during the next clock phase.

The "LATCH" is equal to 1:

in the first write step for which pulse $W_0=1$ and W=1, W meaning that write is enabled in all cases;

in the second write step for which W=1 and $W_0=0$, and also the "LATCH" L for the next stage is equal to 1. (This means that write is enabled if the next stage is not already in write disable);

when not in a write step and the "LATCH" L for the next stage is equal to 1, that means that a read has already been done.

The above conditions may be symbolized by the following equation:

$$L=1 \text{ if } \Phi.(W.W0/W.W0Suiv/.W.Suiv)=1$$

where:

$\Phi$ represents the $\Phi_1$ or $\Phi_2$ pulse, depending on whether the stage is even or odd W represents the two write phases W0 represents the first write phase W.W0=W0 represents the first write phase W.W0 represents the second write phase Suiv represents the pulse output from the next stage W represents the non-writing phase (read possible)

W.Suiv therefore represents a read.

the dot represents logical multiplication and the slash represents a logical OR.

The above equation may be simplified as follows:

$$L=1 \text{ if } \Phi.(Suiv/W.W0)=1$$

Or again, L=1 if $\Phi.(Suiv/W0)$, since W0.W=W0.

The control circuit as shown in FIG. 5 used to implement the above equation has the advantage that it can be made with 17 transistors. This can result in a control circuit with a less complex structure than when a RAM circuit is used with multiplexed and demultiplexed inputs and outputs.

We will now explain in more detail the operation of the circuit in FIG. 5 during the various read and write steps. At the beginning of the first write step, pulse W0 changes to 1 such that W0$\Phi_2$ changes to 1 at each $\Phi_1$ pulse, and W0$\Phi_2$ changes to 1 at each $\Phi_2$ pulse. At this time the various values stored in the shift register stages can propagate as shown in table A below.

TABLE A

| $L_1$ | $L_2$ | $L_3$ | $L_4$ | $L_{m-2}$ | $L_{m-1}$ | $L_m$ | | |
|---|---|---|---|---|---|---|---|---|
| 0 (X) | 0 (X) | 0 (X) | 0 (X) | 0 (X) | 0 (X) | 0 (X) | $\Phi1.W_0 = 0$ | |
| 0 (X) | 0 (X) | 0 (X) | 0 (X) | 0 (X) | 0 (X) | 0 (X) | $\Phi2.W_0 = 0$ | |
| 0 (X) | 0 (X) | 0 (X) | 0 (X) | 0 (X) | 0 (X) | 0 (X) | $\Phi1.W_0 = 1$ | |
| | | | | | | | $W_0\Phi1$ changes to 0 | |
| 1 (X) | 0 (X) | 1 (X) | 0 (X) | 0 (X) | 1 (X) | 0 (X) | $\Phi2.W_0 = 1$ | |
| | | | | | | | $W_0\Phi2$ changes to 0 | |
| 1 (in$_1$) | 1 (X) | 1 (X) | 1 (X) | 1 (X) | 1 (X) | 1 (X) | $\Phi1.W_0 = 1$ | |
| 1 (in$_1$) | 1 (in$_1$) | 1 (X) | 1 (X) | 1 (X) | 1 (X) | 1 (X) | $\Phi2.W_0 = 1$ | |
| 1 (in$_2$) | 1 (in$_1$) | 1 (in$_1$) | 1 (X) | 1 (X) | 1 (X) | 1 (X) | $\Phi1.W_0 = 1$ | |
| 1 (in$_2$) | 1 (in$_2$) | 1 (in$_1$) | 1 (in$_1$) | 1 (X) | 1 (X) | 1 (X) | $\Phi2.W_0 = 1$ | |
| 1 (in$_{l-2}$) | 1 (in$_{l-3}$) | 1 (in$_{l-3}$) | 1 (in$_{l-4}$) | 1 (X) | 1 (X) | 1 (X) | $\Phi1.W_0 = 1$ | |
| 1 (in$_{l-2}$) | 1 (in$_{l-2}$) | 1 (in$_{l-3}$) | 1 (in$_{l-3}$) | 1 (in$_1$) | 1 (X) | 1 (X) | $\Phi2.W_0 = 1$ | |
| 1 (in$_{l-1}$) | 1 (in$_{l-2}$) | 1 (in$_{l-2}$) | 1 (in$_{l-3}$) | 1 (in$_1$) | 1 (in$_1$) | 1 (X) | $\Phi1.W_0 = 1$ | |
| 1 (in$_{l-1}$) | 1 (in$_{l-1}$) | 1 (in$_{l-2}$) | 1 (in$_{l-2}$) | 1 (in$_2$) | 1 (in$_1$) | 1 (in$_1$) | $\Phi2.W_0 = 0$ | |
| | | | | | | | $W_0\Phi2$ changes to 0 | |

In this table, L1; L2; L3; L4; Lm–2; Lm–1; Lm; represent the value of the latch in circuit 5, this value being shown in bold when the circuit is active, in other words when the "OPEN" pulse is equal to 1. During this write phase the R pulse is equal to 0. Moreover, the value of the word contained in the corresponding register is given between parentheses.

At the end of this first write step, the pulse W0 then changes to 0 such that W0Φ2 changes to 0 on the next Φ2 pulse, and W0Φ1 changes to 0 on the next Φ1 pulse. This is then the start of the compression phase, and this compression phase will terminate when the "LATCH" L in the first stage becomes equal to 0. The start of the second write step is shown in table B below.

TABLE B

| START COMPRESSION | | | | | | | | |
|---|---|---|---|---|---|---|---|---|
| $L_1$ | $L_2$ | $L_3$ | $L_4$ | $L_{m-2}$ | $L_{m-1}$ | $L_m$ | | |
| 1 (in$_l$) | 1 (in$_{l-1}$) | 1 (in$_{l-1}$) | 1 (in$_{l-2}$) | 1 (in$_2$) | 1 (in$_2$) | 0 (in$_1$) | $\Phi1.W_0 = 0$ | |
| | | | | | | | $W_0\Phi1$ changes to 0 | |
| 1 (in$_l$) | 1 (in$_l$) | 1 (in$_{l-1}$) | 1 (in$_{l-2}$) | 1 (in$_3$) | 0 (in$_2$) | 0 (in$_1$) | $\Phi2.W_0 = 0$ | |
| 1 (in$_{l+1}$) | 1 (in$_l$) | 1 (in$_l$) | 1 (in$_{l-1}$) | 0 (in$_3$) | 0 (in$_2$) | 0 (in$_1$) | $\Phi1.W_0 = 0$ | |
| 1 (in$_{l+1}$) | 1 (in$_{l+1}$) | 1 (in$_l$) | 1 (in$_l$) | 0 (in$_3$) | 0 (in$_2$) | 0 (in$_1$) | $\Phi2.W_0 = 0$ | |

The end of this write step is represented by table C.

TABLE C

| $L_1$ | $L_2$ | $L_3$ | $L_4$ | $L_{m-2}$ | $L_{m-1}$ | $L_m$ | |
|---|---|---|---|---|---|---|---|
| 1 (in$_{m-1}$) | 1 (in$_{m-2}$) | 1 (in$_{m-2}$) | 0 (in$_{m-3}$) | 0 (in$_3$) | 0 (in$_2$) | 0 (in$_1$) | $\Phi1.W_0 = 0$ |
| 1 (in$_{m-1}$) | 1 (in$_{m-1}$) | 0 (in$_{m-2}$) | 0 (in$_{m-3}$) | 0 (in$_3$) | 0 (in$_2$) | 0 (in$_1$) | $\Phi2.W_0 = 0$ |
| 1 (in$_m$) | 0 (in$_{m-1}$) | 0 (in$_{m-2}$) | 0 (in$_{m-3}$) | 0 (in$_3$) | 0 (in$_2$) | 0 (in$_1$) | $\Phi1.W_0 = 0$ |
| 0 (in$_m$) | 0 (in$_{m-1}$) | 0 (in$_{m-2}$) | 0 (in$_{m-3}$) | 0 (in$_3$) | 0 (in$_2$) | 0 (in$_1$) | $\Phi2.W_0 = 0$ |

Therefore all these write phases are terminated and we obtain information corresponding to one word in each stage of the shift register. During a read step, the pulse W0 is equal to 0, but a read pulse R is sent to the last stage Em so as to read the information in this stage when Φ1 R=1. In this case we will read an isolated word, then information contained in each stage of the register will be shifted as shown in table D below.

TABLE D

| $L_1$ | $L_2$ | $L_3$ | $L_4$ | $L_{m-2}$ | $L_{m-1}$ | $L_m$ | |
|---|---|---|---|---|---|---|---|
| 0 (in$_m$) | 0 (in$_{m-1}$) | 0 (in$_{m-2}$) | 0 (in$_{m-3}$) | 0 (in$_3$) | 0 (in$_2$) | 0 (in$_1$) | $\Phi1.R = 0$ |
| 0 (in$_m$) | 0 (in$_{m-1}$) | 0 (in$_{m-2}$) | 0 (in$_{m-3}$) | 0 (in$_3$) | 0 (in$_2$) | 0 (in$_1$) | $\Phi2.R = 0$ |

TABLE D-continued

| $L_1$ | $L_2$ | $L_3$ | $L_4$ | $L_{m-2}$ | $L_{m-1}$ | $L_m$ | |
|---|---|---|---|---|---|---|---|
| 0 ($in_m$) | 0 ($in_{m-1}$) | 0 ($in_{m-2}$) | 0 ($in_{m-3}$) | 0 ($in_3$) | 0 ($in_2$) | 0 ($in_2$) | $\Phi 1.R = 1$ |
| 0 ($in_m$) | 0 ($in_{m-1}$) | 0 ($in_{m-2}$) | 0 ($in_{m-3}$) | 0 ($in_3$) | 0 ($in_2$) | 0 ($in_2$) | $\Phi 2.R = 0$ |
| 0 ($in_m$) | 0 ($in_{m-1}$) | 0 ($in_{m-2}$) | 0 ($in_{m-3}$) | 0 ($in_3$) | 0 ($in_3$) | 0 ($in_2$) | $\Phi 1.R = 0$ |
| 0 ($in_m$) | 0 ($in_{m-1}$) | 0 ($in_{m-2}$) | 0 ($in_{m-3}$) | 0 ($in_4$) | 0 ($in_3$) | 0 ($in_2$) | $\Phi 2.R = 0$ |
| 0 ($in_m$) | 0 ($in_{m-1}$) | 0 ($in_{m-2}$) | 0 ($in_{m-3}$) | 0 ($in_4$) | 0 ($in_3$) | 0 ($in_2$) | $\Phi 1.R = 0$ |
| 0 ($in_m$) | 0 ($in_{m-1}$) | 0 ($in_{m-2}$) | 0 ($in_{m-2}$) | 0 ($in_4$) | 0 ($in_3$) | 0 ($in_2$) | $\Phi 2.R = 0$ |
| 0 ($in_m$) | 1 ($in_{m-1}$) | 0 ($in_{m-1}$) | 0 ($in_{m-2}$) | 0 ($in_4$) | 0 ($in_3$) | 0 ($in_2$) | $\Phi 1.R = 0$ |
| 0 ($in_m$) | 1 ($in_m$) | 0 ($in_{m-1}$) | 0 ($in_{m-2}$) | 0 ($in_4$) | 0 ($in_3$) | 0 ($in_2$) | $\Phi 2.R = 0$ |
| 1 (X) | 0 ($in_m$) | 0 ($in_{m-1}$) | 0 ($in_{m-2}$) | 0 ($in_4$) | 0 ($in_3$) | 0 ($in_2$) | $\Phi 1.R = 0$ |
| 0 (X) | 0 ($in_m$) | 0 ($in_{m-1}$) | 0 ($in_{m-2}$) | 0 ($in_4$) | 0 ($in_3$) | 0 ($in_2$) | $\Phi 2.R = 0$ |

When all operations have been carried out, the word in2 can be read on the last stage.

According to one alternative, we can also read the next word during each clock cycle (40.5 MHz), $\Phi 1$. R being set equal to 1 and so on for subsequent words.

The above describes one possible method of embodiment of the process in this invention. One of its advantages is that it makes it possible to use a small number of transistors in the control circuit.

What is claimed is:

1. Control process for a first input-first output type circuit capable of managing m n-bit words, said circuit comprising m stages coupled in series, each of said m stages comprising n memory points arranged in parallel, even ones of said m stages being controlled by a first clock signal and odd ones of said m stages being controlled by a second clock signal, said first and second clock signals being non-overlapping, wherein said control process comprises:

a first write step in which each of a first m/2 of said n-bit words is written into a first one of said m stages and shifted as a function of said first and second clock signals for storing each of said first m/2 words in a respective one of said odd stages and in a respective one of said even stages, said respective one of said even stages being a stage successive to said respective one of said odd stages;

a second write step beginning after completion of said first write step in which on each of said first and second clock signals, writing in one of said m stages is disabled beginning with the m-th stage and proceeding successively to the first stage, and during which writing of m/2 of said m words not included in said first m/2 words being done as in the first write step in stages that are not yet disabled such that each of said m words is stored in a respective one of said m stages when writing is disabled in all of said m stages; and a read step comprising successively shifting words in each stage into a successive stage on each of said first and second clock signals, a word being read from said m-th stage when all the stages have been shifted.

2. Process according to claim 1 wherein the first and second clock signals correspond to respective first and second phases of a particular clock signal.

3. Process according to claim 2, wherein the frequency of said particular clock signal is greater than 1 MHz, and is preferably 40.5 MHz.

4. Process according to claim 3, wherein write steps are not enabled during the read step.

5. Process according to claim 4, wherein write and read steps are separated in time.

6. Process according to claim 4, wherein the read step is initialized during the second write step.

7. Process according to claim 6, wherein the write enable in a stage of the shift register is given by the following formula:

$$L = 1 \text{ if } \Phi \cdot (Suiv + W0) = 1$$

where L is the value of a latch circuit, $\Phi$ represents one of said first and second clock signals depending on whether the stage is an even or odd stage, W0 is the write enable pulse during the first write step, Suiv is the enable signal for the next stage and . and + are logical operators, the last stage being initialized by the value W0+R=1 where R represents the read signal.

8. Device for the embodiment of the process according to claim 7, wherein each of said m stages having first and second control inputs, the odd stages receiving the first clock signal ($\Phi 1$) on their first control input and the second clock signal ($\Phi 2$) on their second control input, the even stages receiving the second clock signal ($\Phi 2$) on their first control input and the first clock signal ($\Phi 1$) on their second control input, the odd stages receiving an inverted pulse Wo$\Phi 1$ and even stages receiving an inverted pulse Wo$\Phi 2$ where Wo represents a write validation pulse, a read validation pulse being applied on the last stage of the shift register.

9. Device according to claim 8, wherein each stage comprises a control circuit comprising a first logic gate circuit receiving Wo$\Phi 1$ or Wo$\Phi 2$ on a first input depending on whether the stage is odd or even, and receiving a pulse output from the previous stage on a second input, a latch circuit receiving the output from the first logic gate circuit and outputting a pulse to the previous stage, said latch circuit being controlled either by the second clock signal or by the first clock signal, a second logic gate circuit receiving the output from the latch circuit at a first input via a first inverter, and receiving either the first clock signal or the second clock signal at a second input, the output from the second logic gate circuit being coupled to the stage via a second inverter to enable or disable writing in the stage.

10. Control process for a first input-first output type circuit capable of managing m n-bit words, said circuit comprising m stages coupled in series, each of said m stages comprising n memory points arranged in parallel, even ones of said m stages being controlled by a first clock signal and odd ones of said m stages being controlled by a second clock signal, said first and second clock signals being non-overlapping, wherein said control process comprises:

a first write step in which each of a first m/2 of said n-bit words is written into a first one of said m stages and shifted as a function of said first and second clock signals for storing each of said first m/2 words in a respective one of said odd stages and in a respective one of said even stages, said respective one of said even stages being a stage successive to said respective one of said odd stages;

a second write step beginning after completion of said first write step in which on each of said first and second clock signals, writing in one of said m stages is disabled beginning with the m-th stage and proceeding successively to the first stage, and during which writing of m/2 of said m words not included in said first m/2 words being done as in the first write step in stages that are not yet disabled such that each of said m words is stored in a respective one of said m stages when writing is disabled in all of said m stages; and a read step comprising successively shifting words in each stage into a successive stage on each of said first and second clock signals, a word being read from said m-th stage at every two clock signals or at every cycle of one of said first and second clock signals.

11. Process according to claim 10 wherein the first and second clock signals correspond to respective first and second phases of a particular clock signal.

12. Process according to claim 11, wherein the frequency of said particular clock signal is greater than 1 MHz, and is preferably 40.5 MHz.

13. Process according to claim 12, wherein write steps are not enabled during the read step.

14. Process according to claim 13, wherein write and read steps are separated in time.

15. Process according to claim 13, wherein the read step is initialized during the second write step.

16. Process according to claim 15, wherein the write enable in a stage of the shift register is given by the following formula:

$$L=1 \text{ if } \Phi.(Suiv+W0)=1$$

where L is the value of a latch circuit, $\Phi$ represents one of said first and second clock signals depending on whether the stage is an even or odd stage, W0 is the write enable pulse during the first write step, Suiv is the enable signal for the next stage and . and + are logical operators, the last stage being initialized by the value W0+R=1 where R represents the read signal.

17. Device for the embodiment of the process according to claim 16, wherein each of said m stages having first and second control inputs, the odd stages receiving the first clock signal ($\Phi1$) on their first control input and the second clock signal ($\Phi2$) on their second control input, the even stages receiving the second clock signal ($\Phi2$) on their first control input and the first clock signal ($\Phi1$) on their second control input, the odd stages receiving an inverted pulse Wo$\Phi1$ and even stages receiving an inverted pulse Wo$\Phi2$ where Wo represents a write validation pulse, a read validation pulse being applied on the last stage of the shift register.

18. Device according to claim 17, wherein each stage comprises a control circuit comprising a first logic gate circuit receiving Wo$\Phi1$ or Wo$\Phi2$ on a first input depending on whether the stage is odd or even, and receiving a pulse output from the previous stage on a second input, a latch circuit receiving the output from the first logic gate circuit and outputting a pulse to the previous stage, said latch circuit being controlled either by the second clock signal or by the first clock signal, a second logic gate circuit receiving the output from the latch circuit at a first input via a first inverter, and receiving either the first clock signal or the second clock signal at a second input, the output from the second logic gate circuit being coupled to the stage via a second inverter to enable or disable writing in the stage.

* * * * *